(12) United States Patent
Isokawa et al.

(10) Patent No.: US 6,301,207 B1
(45) Date of Patent: Oct. 9, 2001

(54) INFORMATION STORAGE DEVICE AND SERVO GAIN COMPENSATING METHOD IN INFORMATION STORAGE DEVICE

(75) Inventors: Hiroshi Isokawa, Kawasaki; Yukio Abe, Higashine, both of (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/209,331

(22) Filed: Dec. 11, 1998

(30) Foreign Application Priority Data

Jun. 18, 1998 (JP) .................................................. 10-171143

(51) Int. Cl.[7] ........................................................ G11B 7/00
(52) U.S. Cl. ...................................... 369/44.36; 369/53.45
(58) Field of Search ............................ 369/44.25, 44.27, 369/44.29, 44.32, 44.35, 47.25, 47.39, 53.12, 53.28, 53.45, 53.37, 44.36, 47.4, 47.44, 53.42, 124.1

(56) References Cited

FOREIGN PATENT DOCUMENTS 5258319  10/1993  (JP) .

Primary Examiner—Paul W. Huber
(74) Attorney, Agent, or Firm—Greer, Burns & Crain, Ltd.

(57) ABSTRACT

Disclosed is a servo gain compensating method for compensating a servo gain when in a seek operation and in a positioning process in an information storage device. The servo gain compensating method and a device thereof make compensation to a precise servo gain even when a temperature changes abruptly. The information storage device includes a head for reading information from a storage medium, an actuator for moving the head, a control circuit for calculating a drive quantity compensated by the servo gain value from positional information read by the head, and a driving circuit for driving the actuator on the basis of the drive quantity. The servo gain compensating method includes a step of periodically measuring a temperature of the information storage device through a temperature detecting element for measuring the temperature of the device, a step of judging whether or not a difference between the measured temperature and the temperature measured last time is over a fixed value, a first step of obtaining, if the difference is not over the fixed value, a servo gain value referring to a first table of a first servo gain characteristic, and a second step of obtaining, if the difference is over the fixed value, a servo gain value referring to a second table of a second servo gain characteristic. In the second step, a calibration seek may be executed.

18 Claims, 8 Drawing Sheets

FIG. 2A

| Temperature | Gain |
|---|---|
| 20 °C | $-\beta_1$ |
| 25 °C | $\pm 0$ |
| 30 °C | $\alpha_1$ |
| 35 °C | $\alpha_2$ |
| 40 °C | $\alpha_3$ |

| Temperature | Gain |
|---|---|
| 20 °C | $-b_1$ |
| 25 °C | $\pm 0$ |
| 30 °C | $a_1$ |
| 35 °C | $a_2$ |
| 40 °C | $a_3$ |

11-2

INFORMATION STORAGE DEVICE AND SERVO GAIN COMPENSATING METHOD IN INFORMATION STORAGE DEVICE

BACKGROUND OF THE INVENTION

1. Field of the Invention

The present invention relates generally to an information storage device and a servo gain compensating method of compensating a servo gain when in a seek operation and in a positioning process in the information storage device for reading or reading/writing information from and to a storage medium by a head, and more particularly to an information storage device and a servo gain compensating method of setting a servo gain corresponding to a measured temperature.

2. Description of the Related Art

An information storage device such as a magnetic disk device, etc. has been widely utilized as a storage device of a computer, etc. This type of information storage device has a servo loop for driving an actuator in accordance with position signal read from the head.

A scatter in terms of characteristics of a magnet and a coil of a voice coil motor (VCM) for moving the magnetic head, might be a factor for causing problems in a loop gain of a servo control system. Further, the scatter in gain of a control loop system circuit of a power amplifier, etc. also leads to a scatter in the loop gain of the servo control system. The scatter in the characteristic of the VCM and the scatter in the gain of the control system circuit may be integrated and conceived as a scatter in a servo loop gain of the control system.

In the magnetic disk device, the servo control is executed by compensating the above scatter (a gain compensation) when in the seek operation and in the positioning process on a target track. This servo gain value changes depending on an environment temperature of the device, and hence there must be a necessity for compensating the servo gain at an interval of a fixed time (5 min–10 min).

A calibration seek may be a general method as the one described above. According to the calibration seek, a drive current having a fixed value flows to the VCM for a fixed period of time, thereby executing a seeking process of the VCM. This method is that when in this seeking process, a quantity of displacement is measured from the positional information of the magnetic head, and a servo gain is measured based on the quantity of displacement. According to this calibration seek method, a precise servo gain value at that point of time can be measured. However, the seek operation is carried out, during which there is a necessity for having a host request wait. Therefore, a technology of compensating the servo gain without having the host request wait is needed.

FIG. 7 is a diagram showing a construction in the prior art.
FIG. 8 is an explanatory diagram showing the prior art.

As illustrated in FIG. 7, a magnetic disk drive 91 includes a magnetic disk 92 and a magnetic head 90. The magnetic disk 92, on which a servo signal is recorded per sector, is rotated by a spindle motor 93. The magnetic head 90 reads and writes information from and to the magnetic disk 91.

The magnetic head 90 is moved in a track traversing direction on the magnetic disk 91 by a voice coil motor (VCM) 98. A control circuit 96 detects a present position of the head in accordance with a position signal given from the magnetic head 90, and generates a control value corresponding to a distance from a position to be sought.

For compensating scatters in characteristics of the VCM 98 and of the power amplifier 95, the control value is multiplied by the servo gain value. A drive value is outputted to the power amplifier 95, thereby driving the VCM 98.

This servo gain value changes depending on the temperature. A parameter table stored with the servo gain values at the respective temperatures is therefore prepared. This parameter table is, as shown in FIG. 8, stored with the servo gain value at every temperature. Further, the magnetic disk drive 91 is provided with a temperature sensor 94 for detecting a temperature of the drive 91.

In such a construction, the control circuit 96 periodically measures the temperature of the drive through the temperature sensor 94. Then, the control circuit 96 obtains a servo gain from the measured temperature referring to the parameter table in the memory 97. The servo control is executed based on this servo gain.

Thus, according to the prior art, the servo gain is compensated to a servo gain value corresponding to the temperature of the device without performing the calibration seek.

There arise, however, the following problems inherent in the prior art.

With downsizing of the magnetic disk device, the magnetic disk device is built in an electronic appliance such as a portable computer etc. In this case, the magnetic disk device receives heat from other units (such as, e.g., a host processor and a display unit) of the electronic appliance. These other units emit heat when operated but do not emit heat when not operated.

Therefore, the environment temperature of the magnetic disk device changes. The small-sized magnetic disk device has a small thermal capacity, and hence the temperature might change depending on the environment temperature. The temperature sensor measures the characteristics of the VCM and of the power amplifier from the temperature of the device. If the environment temperature changes abruptly, the characteristics of the VCM and of the power amplifier do not follow up the change in the temperature.

Accordingly, when using the servo gain in the table created on the assumption of the temperature change due to the emission of heat from the VCM and the power amplifier, the problem is that the servo gain can not be compensated to the servo gain value suited to the characteristics of the VCM and the power amplifier.

SUMMARY OF THE INVENTION

It is a primary object of the present invention to provide a servo gain compensating method in an information storage device, of making compensation to a precise servo gain.

It is another object of the present invention to provide a servo gain compensating method in an information storage device, of making compensation to a precise servo gain no matter how a temperature may change.

It is still another object of the present invention to provide a servo gain compensating method in an information storage device, of making compensation to a servo gain accurately coincident with characteristics of a VCM and of a power amplifier in accordance with a change in temperature.

According to a first aspect of the present invention, an information storage device comprises a storage medium, a head for reading information from the storage medium, an actuator for moving the head, a control circuit for generating a control quantity for positioning the head from positional information read from the storage medium by the head and calculating a drive quantity with the control quantity compensated by a servo gain value, and a driving circuit for driving the actuator based on the drive quantity.

And according to the first aspect of the present invention, a servo gain compensating method comprises a step of periodically measuring a temperature of the information storage device through a temperature detecting element for measuring the temperature of the information storage device, a step of judging whether or not a difference between the measured temperature and the temperature measured last time is over a fixed value, a first step of obtaining, if the difference is not over the fixed value, a servo gain value corresponding to the measured temperature with reference to a first table stored with a first servo gain characteristic, and a second step of obtaining, if the difference is over the fixed value, a servo gain value corresponding to the measured temperature with reference to a second table stored with a second servo gain characteristic.

According to the first aspect of the present invention, there are provided the first table stored with the servo gain at each temperature when the temperature does not change abruptly, and the second table stored with the servo gain at each temperature when the temperature changes abruptly. Then, it is judged whether or not the temperature changes abruptly. If the temperature does not change abruptly, the servo gain is compensated referring to the first table. If the temperature changes abruptly, the second table is referred to.

Therefore, even when the temperature changes abruptly as in the case of the change in the environment temperature, the compensation to the precise servo gain can be made. Besides, since the calibration seek is not required to be done, there might be no possibility of having a host request wait.

According to a second aspect of the present invention, a servo gain compensating comprises a step of periodically measuring a temperature of the information storage device; through a temperature detecting element for measuring the temperature of the information storage device, a step of judging whether or not a difference between the measured temperature and the temperature measured last time is over a fixed value; a first step of obtaining, if the difference is not over the fixed value, a servo gain value corresponding to the measured temperature with reference to a table stored with a servo gain characteristic, and a second step of measuring, if the difference is over the fixed value and after driving an actuator by a fixed drive current for a fixed period of time, a quantity of displacement due to the drive from the positional information of the head, and calculating a servo gain value from the quantity of displacement.

According to the second aspect of the present invention, it is judged whether or not the temperature changes abruptly. If the temperature does not change abruptly, the servo gain is compensated referring to the table. If the temperature changes abruptly, the calibration seek is conducted, and the servo gain is measured.

Hence, even when the temperature changes abruptly as in the case of the change in the environment temperature, the compensation to the precise servo gain can be made. Besides, since the calibration seek is performed only when the temperature changes abruptly, there might be a less possibility of having the host request waited.

According to a third aspect of the present invention, the first step comprises a step of calculating the servo gain value at the measured temperature from a temperature gradient coefficient corresponding to the measured temperature.

According to a fourth aspect of the present invention, the second step comprises a step of calculating the servo gain value at the measured temperature from the temperature gradient coefficient corresponding to the measure temperature.

According to a fifth aspect of the present invention, the servo gain compensating method further comprises a step of driving, when switching ON the power supply of the information storage device, the actuator for a fixed period of time by a fixed drive current, a step of measuring a quantity of displacement due to the drive from the positional information of said head, and a step of calculating an intrinsic-to-device reference value of the servo gain from the quantity of displacement. Then, the first step comprises a step of calculating the servo gain value from the reference value and the temperature gradient coefficient.

According to a sixth aspect of the present invention, the servo gain compensating method further comprises a step of driving, when switching ON the power supply of the information storage device, the actuator for a fixed period of time by a fixed drive current, a step of measuring a quantity of displacement due to the drive from the positional information of said head, and a step of calculating an intrinsic-to-device reference value of the servo gain from the quantity of displacement. Then, the second step comprises a step of calculating the servo gain value from the reference value and the temperature gradient coefficient.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 2A and 2B are diagrams each showing a structure of a compensation table in FIG. 1;

DETAILED DESCRIPTION OF THE PREFERRED EMBODIMENTS

Figure 1:
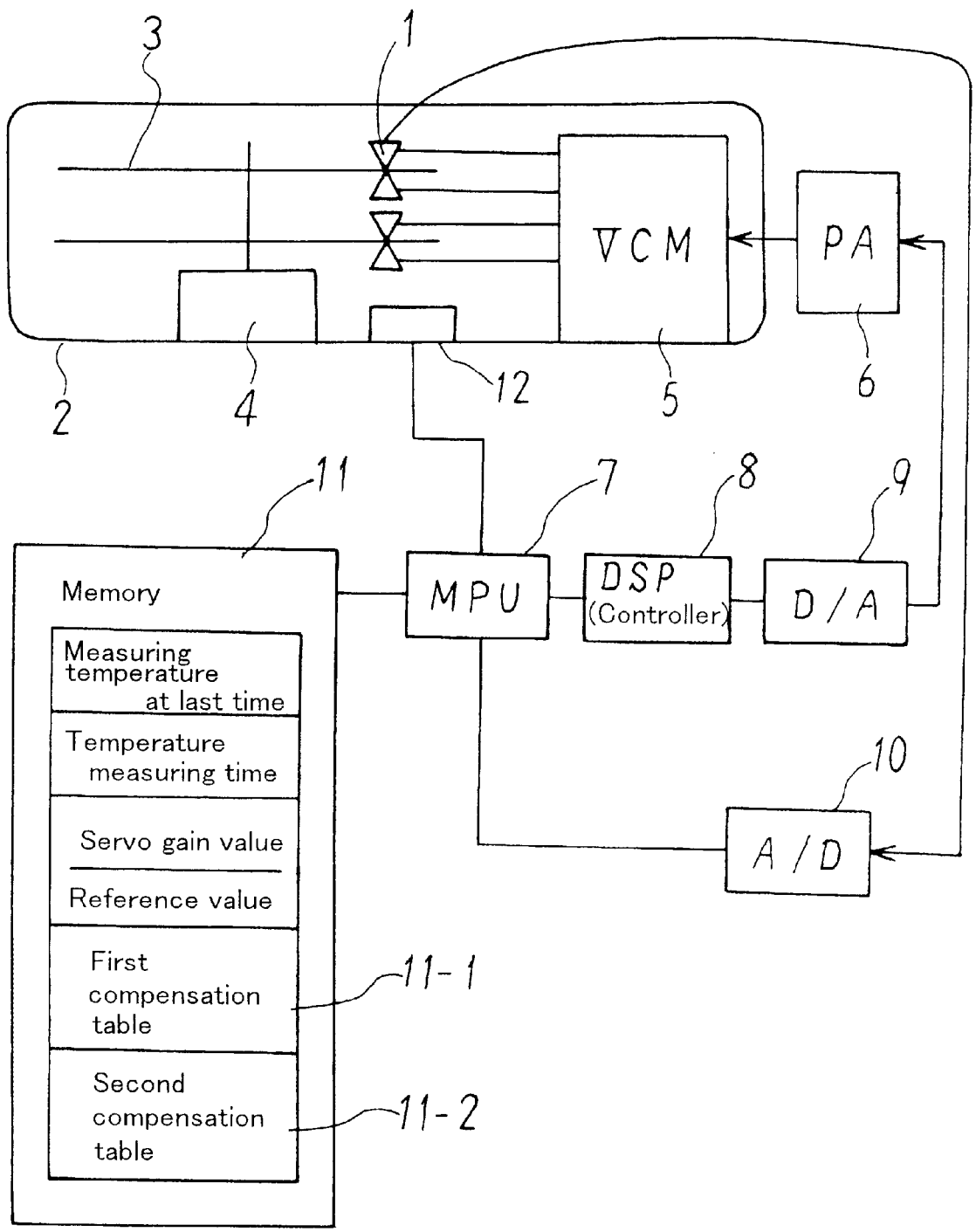
FIG. 1 is a diagram showing a construction in one embodiment of the present invention.
Figure 3:
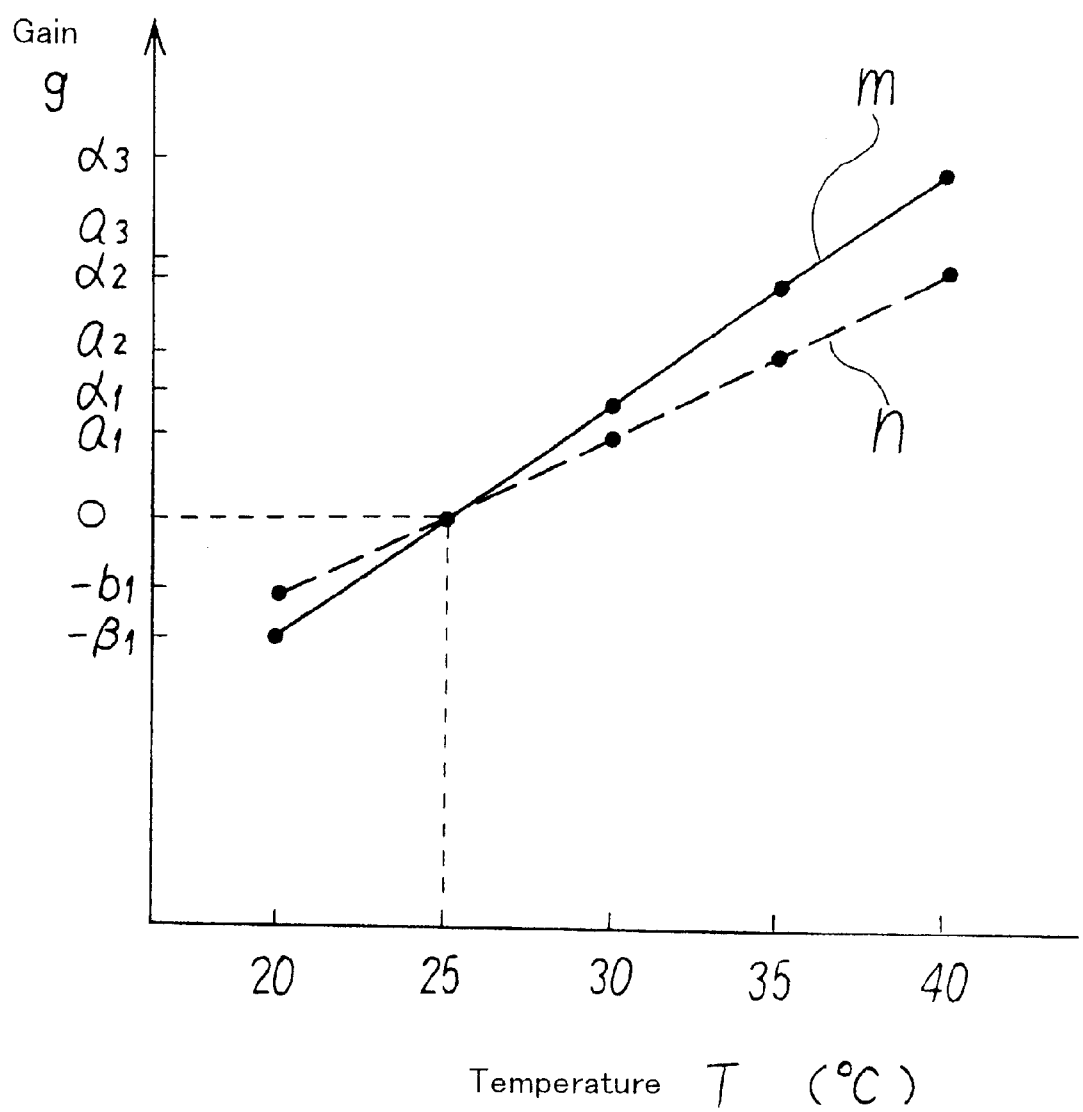
FIG. 3 is an explanatory diagram showing the compensation table in FIG. 1.

FIG. 1 is a diagram showing a construction in one embodiment of the present invention. FIGS. 2A and 2B are diagrams each showing a structure of a compensation table in FIG. 1. FIG. 3 is an explanatory diagram showing the compensation table in FIG. 1.

As illustrated in FIG. 1, a magnetic disk drive 2 includes a magnetic disk 3 and a magnetic head 1. The magnetic disk 3 has a data surface on which servo signals are embedded in data tracks. The magnetic head 1 reads and writes information from and to the magnetic disk 3. The magnetic disk 3 is rotated by a spindle motor 4.

A voice coil motor (VCM) 5 moves the magnetic head 1 in a track traversing direction on the magnetic disk 3. A power amplifier 6 drives the VCM 5. A control circuit is constructed of a microprocessor (MPU) 7 and a digital signal processor (DSP) 8.

The MPU 7 controls the whole drive. The DSP 8 detects a present position of the head in accordance with a position signal given from the magnetic head 1, and generates a control value corresponding to a distance to a position to be sought. Further, the DSP 8 generates a drive value by multiplying this control value by a servo gain value in a memory 11. A digital/analog converter 9 converts this drive value into an analog drive quantity, and outputs this quantity to the power amplifier 6.

An analog/digital converter 10 converts a servo signal of the magnetic head 1 into a digital position signal. The memory 11 is connected to the MPU 7. The memory 11 is stored with a servo gain value, and a measured temperature which are given last time and a temperature measuring time (a period). The memory 11 is provided with a first compensation table 11-1 and a second compensation table 11-2. A temperature sensor 12 detects a temperature of the magnetic disk drive 2.

The compensation tables 11-1, 11-2 are explained referring to FIGS. 2A, 2B and 3.

The first compensation table 11-1 is stored with the servo gain values corresponding to respective temperatures when the temperature does not abruptly change. As shown in FIG. 2A, the compensation table is stored with the gain values ($-\beta 1$ to 0.3) corresponding to the respective temperatures at an interval of 5° C. ranging from 20° C. to 40° C. As indicated by the solid line "m" in FIG. 3, the gain value is a relative gain value (a temperature gradient value), wherein 25° C. is set as a reference value "0".

On the other hand, the second compensation table 11-2 is stored with the servo gain values corresponding to respective temperatures when the temperature abruptly changes. As shown in FIG. 2B, the compensation table is stored with the gain values (-b1 to a3) corresponding to the respective temperatures at the interval of 5° C. ranging from 20° C. to 40° C. As indicated by the dotted line "n" in FIG. 3, the gain value is a relative gain value (the temperature gradient value), wherein 25° C. is set as the reference value "0".

If the temperature abruptly changes, characteristics of the VCM and of the power amplifier do not follow up the temperature, and hence a temperature gradient defined as a characteristic of the gain value in the second compensation table 11-2 is set smaller than a temperature gradient defined as a characteristic of the gain value in the first compensation table 11-1.

These compensation tables 11-1, 11-2 are created based on the servo gain values previously measured by calibration seeks of a multiplicity of magnetic disk drives at the respective temperatures.

Figure 4:
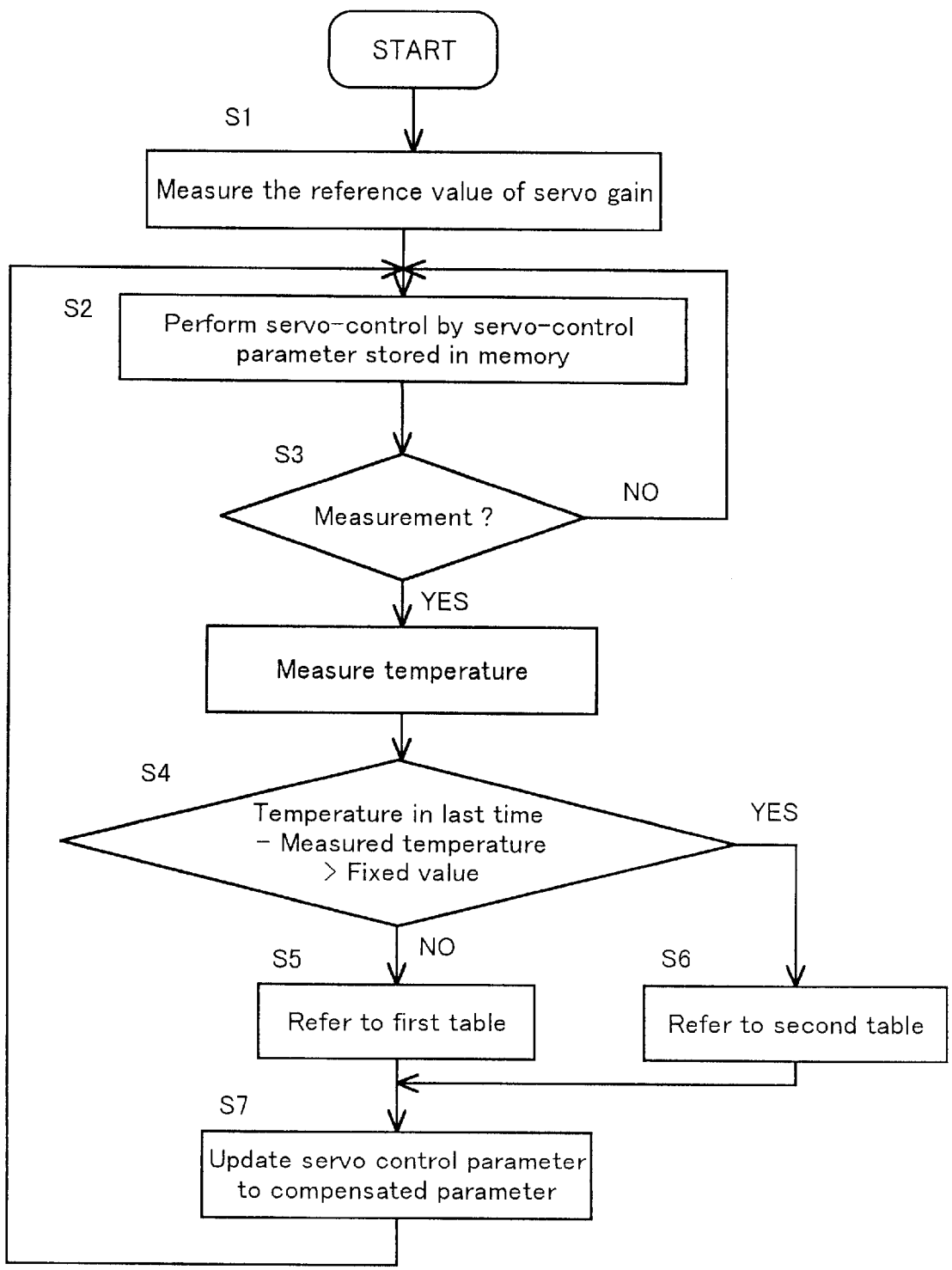
FIG. 4 is a flowchart showing a servo control process in one embodiment of the present invention.
Figure 5:
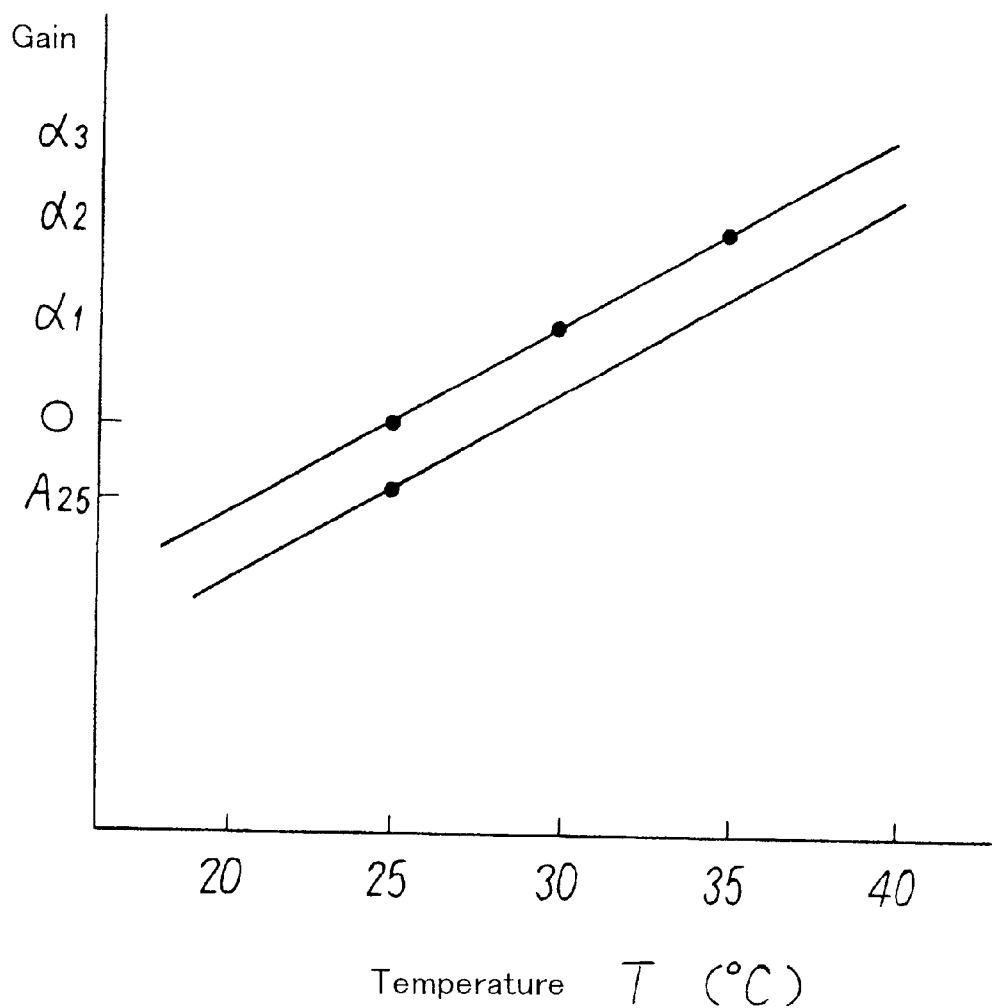
FIG. 5 is an explanatory diagram showing a reference value in the process in FIG. 4.

FIG. 4 is a flowchart showing a servo control process in one embodiment of the present invention. FIG. 5 is an explanatory diagram showing a reference value measuring operation in FIG. 4.

(S1) When delivered from a factory of the drive or/and when switching ON the power supply, the reference value of the servo gain (a parameter) is measured. As shown in FIG. 5, the first and second compensation tables 11-1, 11-2 are used in common to each drive, wherein the reference value of 25° C. is set to "0". This reference value A25 is, however, different per device, and therefore the MPU 7 calculates a reference value intrinsic to the device at 25° C.

Hence, the MPU 7 indicates the calibration seek. A drive signal having a fixed drive value is thereby outputted for a fixed period of time from the DSP 8, thus driving the VCM 8. The MPU 7 measures a quantity of displacement of the magnetic head 1 due to this drive from the position signal of the magnetic head 1. Then, the MPU 7 calculates a servo gain value A from the quantity of displacement. Further, the MPU 7 measures a drive temperature T at this time through the temperature sensor 12.

Then, based on the following formulae, the MPU 7 calculates the servo gain value (the reference value) A25 intrinsic to the device at 25° C. by using the gain values $-\beta 1$ to 0.3 in the first compensation table 11-1.

$$\text{When } 25° \text{ C.} > T \geq 20° \text{ C.}, A25 = -\beta 1(T-20)/5 + A \quad (1)$$

$$\text{When } 30° \text{ C.} > T \geq 25° \text{ C.}, A25 = \alpha 1(T-25)/5 + A \quad (2)$$

$$\text{When } 35° \text{ C.} > T \geq 30° \text{ C.}, A25 = \alpha 2(T-30)/5 + A \quad (3)$$

$$\text{When } 40° \text{ C.} > T \geq 35° \text{ C.}, A25 = \alpha 3(T-35)/5 + A \quad (4)$$

This servo gain value is stored in the memory 11. Further, the above-measured servo gain value A is stored as the present servo gain value in the memory 11.

(S2) The MPU 7 notifies the DSP 8 of the servo gain value stored in the memory 11. The DSP 8 thereby performs the servo control based on the servo gain value.

(S3) The MPU 7 judges whether or not a value of a built-in timer reaches the temperature measuring time in the memory 11. The temperature measuring interval is set to 5 min–10 min. The MPU 7, if the timer value does not yet reach the temperature measuring time, returns to step S2. While on the other hand, the MPU 7, when judging that the timer value reaches the temperature measuring time, measures a temperature "t" with the aid of the temperature sensor 12.

(S4) The MPU 7, after reading a measured temperature t0 measured last time which has been stored in the memory 11, calculates a difference between the measured temperature t0 measured last time and a measured temperature "t" measured this time. Then, the MPU 7 judges whether this difference exceeds a judgement value or not.

(S5) The MPU 7, if the difference does not exceed the judgement value, judges that the temperature does not abruptly change. Then, the MPU 7 calculates the servo gain value by use of the first compensation table 11-1. Namely, the first compensation table 11-1 is stored with the gain values at the interval of 5° C., and therefore a gain value of the temperature "t" is calculated by implementing a linear interpolation. Hence, in accordance with the following formulae, the MPU 7 calculates a servo gain value At at the measured temperature "t" by using the gain values $-\beta 1$ to 0.3 in the first compensation table 11-1.

$$\text{When } 25° \text{ C.} > t \geq 20° \text{ C.}, At = -\beta 1(t-20)/5 + A25 \quad (5)$$

$$\text{When } 30° \text{ C.} > t \geq 25° \text{ C.}, At = \alpha 1(t-25)/5 + A25 \quad (6)$$

$$\text{When } 35° \text{ C.} > t \geq 30° \text{ C.}, At = \alpha 2(t-30)/5 + A25 \quad (7)$$

$$\text{When } 40° \text{ C.} > t \geq 35° \text{ C.}, At = \alpha 3(t-35)/5 + A25 \quad (8)$$

(S6) The MPU 7, if the difference exceeds the judgement value, judges that the temperature abruptly changes. Then, the MPU 7 calculates the servo gain value by use of the second compensation table 11-2. Namely, the second compensation table 11-2 is stored with the gain values at the interval of 5° C., and therefore a gain value of the temperature "t" is calculated by implementing the linear interpolation. Hence, in accordance with the following formulae, the MPU 7 calculates the servo gain value At at the measured temperature "t" by using the gain values –b to a3 in the second compensation table 11-2.

When 25° C.>t≧20° C., $At=-b1(t-20)/5+A25$ (9)

When 30° C.>t≧25° C., $At=a1(t-25)/5+A25$ (10)

When 35° C.>t≧30° C., $At=a2(t-30)/5+A25$ (11)

When 40° C.>t≧35° C., $At=a3(t-35)/5+A25$ (12)

(S7) The MPU 7 updates the servo gain value in the memory 11 to the calculated servo gain value. Further, the measured temperature, measured last time, in the memory 11 is updated to the measured temperature of this time. Then, the MPU 7 returns to step S2.

Thus, it is judged whether the temperature changes abruptly or not, and the compensation gain value for the temperature concerned is varied. Hence, it is feasible to obtain the precise servo gain value in which the characteristics of the VCM and of the power amplifier reflect.

Moreover, because of referring to the tables, the calibration seek is not conducted during the operation, and it is therefore possible to prevent having a host request wait.

Furthermore, before the operation when switching ON the power supply, the calibration seek is carried out, and the reference value (the intrinsic value) of the device is measured, whereby the temperature characteristic corresponding to each device can be imparted.

Figure 6:
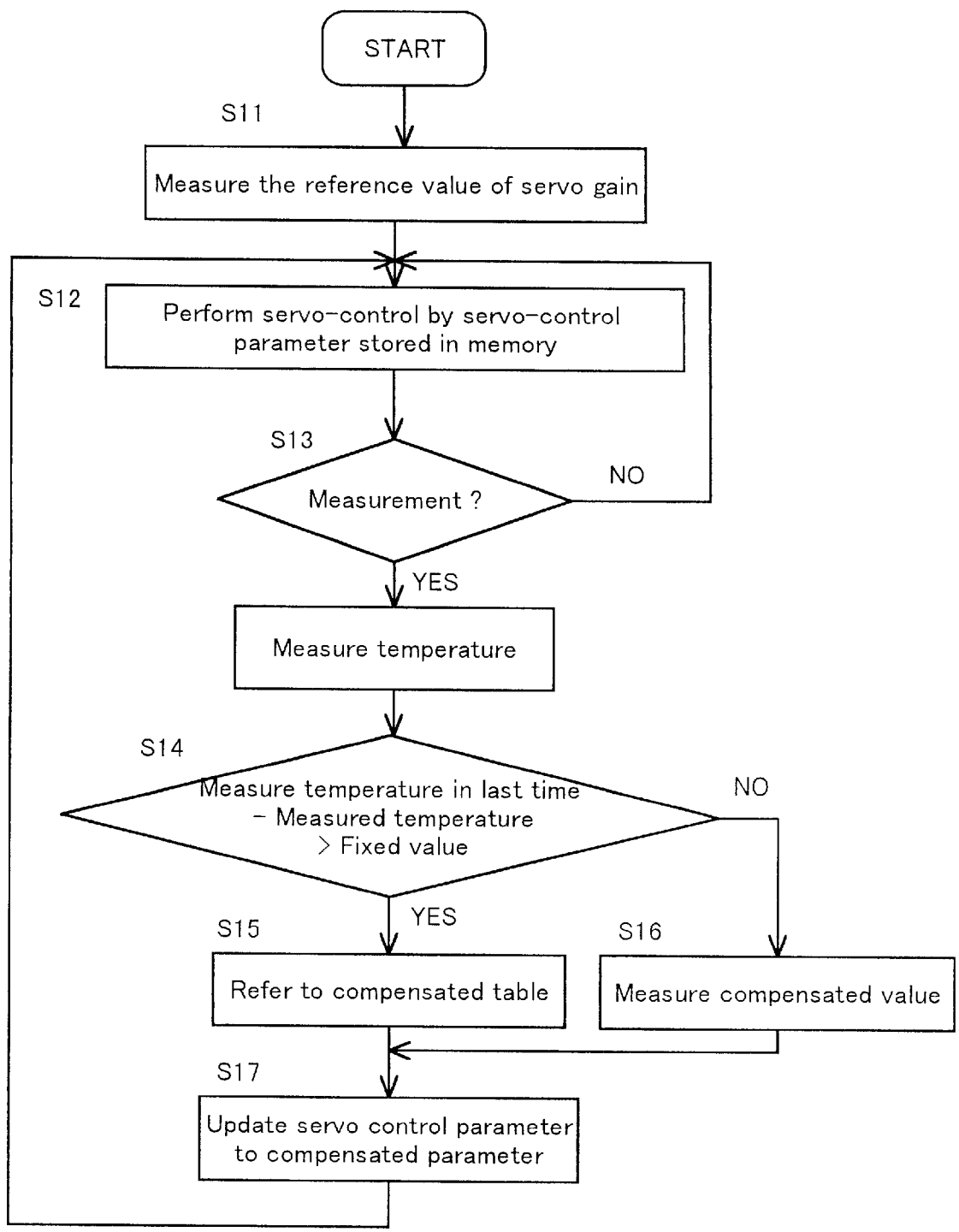
FIG. 6 is a flowchart showing a servo control process in another embodiment of the present invention.
Figure 7:
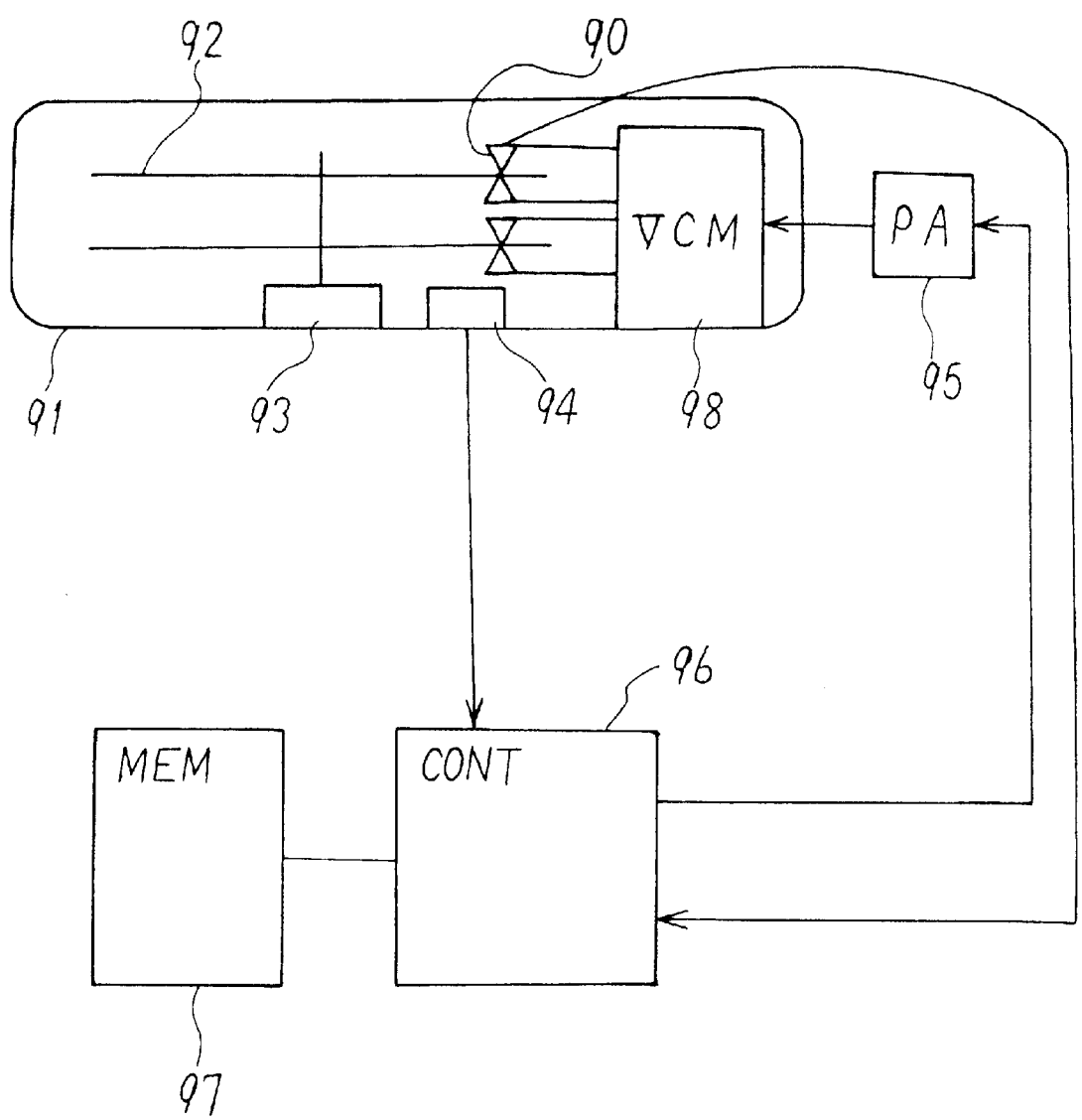
FIG. 7 is a diagram illustrating a construction in the prior art.
Figure 8:
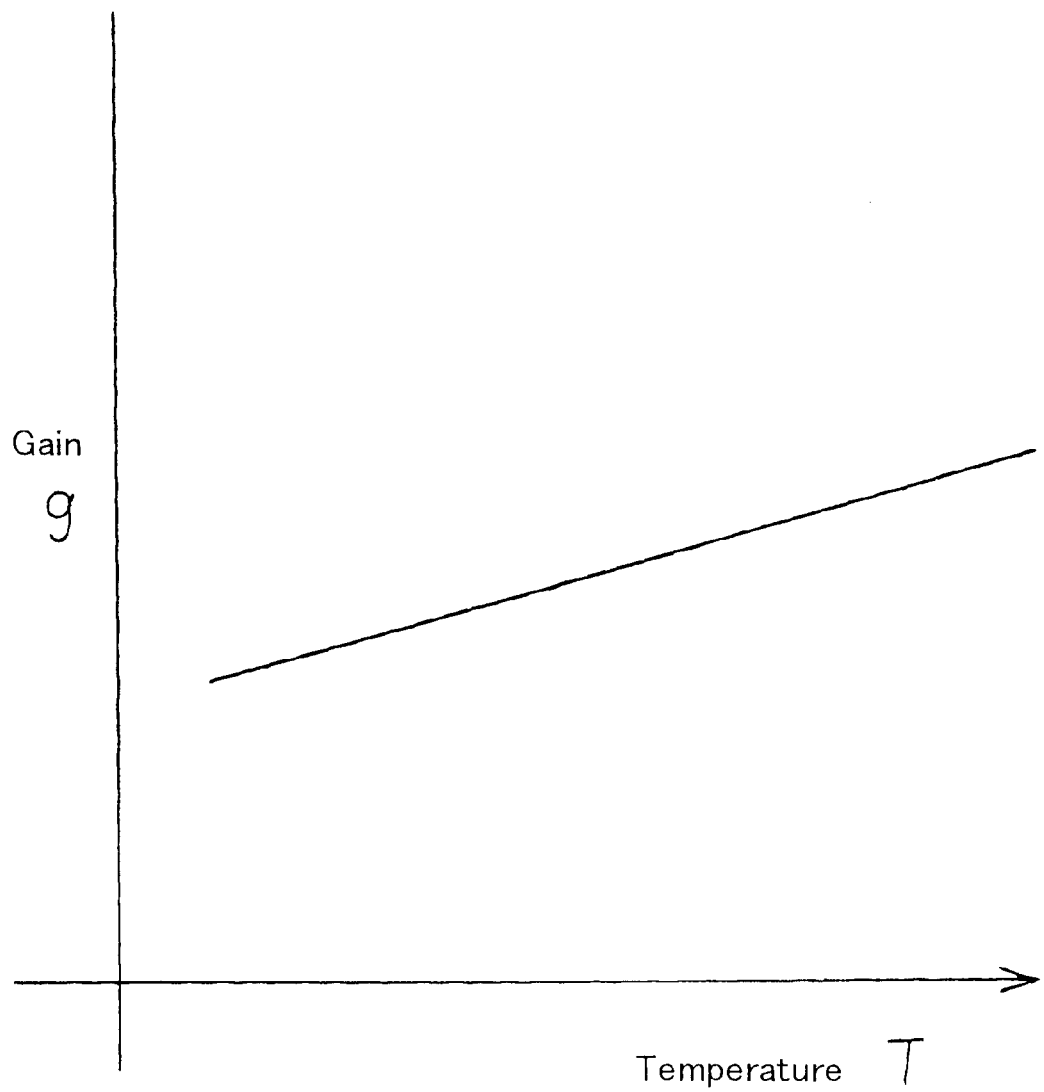
FIG. 8 is an explanatory diagram showing the prior art.

FIG. 6 is a flowchart showing a servo control process in another embodiment of the present invention.

In this embodiment, the second compensation table 11-2 is eliminated from the memory 11. Other configurations are the same as those in FIG. 1.

(S11) As in the same way with step S1, when delivered from the factory of the drive or/and when switching ON the power supply, the reference value of the servo gain (the parameter) is measured. Hence, the MPU 7 indicates the calibration seek. The drive signal having a fixed drive value is thereby outputted for a fixed period of time from the DSP 8, thus driving the VCM 5. The MPU 7 measures a quantity of displacement of the magnetic head 1 due to this drive from the position signal of the magnetic head 1. Then, the MPU 7 calculates a servo gain value A from the quantity of displacement. Further, the MPU 7 measures a drive temperature T at this time through the temperature sensor 12.

Then, based on the following formulae (1)–(4), the MPU 7 calculates the servo gain value (the reference value) A25 intrinsic to the device at 25° C. by using the gain values –β1 to 0.3 in the first compensation table 11-1 (see FIG. 1) in the memory 11. The memory 11 is stored with this servo gain value. Further, the above-measured servo gain value A is stored as the present servo gain value in the memory 11.

(S12) The MPU 7 notifies the DSP 8 of the servo gain value stored in the memory 11. The DSP 8 thereby performs the servo control based on the servo gain value.

(S13) The MPU 7 judges whether or not a value of the built-in timer reaches the temperature measuring time in the memory 11. The temperature measuring interval is set to 5 min–10 min. The MPU 7, if the timer value does not yet reach the temperature measuring time, returns to step S12. While on the other hand, the MPU 7, when judging that the timer value reaches the temperature measuring time, measures the temperature "t" with the aid of the temperature sensor 12.

(S14) The MPU 7, after reading the measured temperature t0 measured last time which has been stored in the memory 11, calculates a difference between the measured temperature t0 measured last time and the measured temperature "t" measured this time. Then, the MPU 7 judges whether this difference exceeds a judgement value or not.

(S15) The MPU 7, if the difference does not exceed the judgement value, judges that the temperature does not abruptly change. Then, the MPU 7 calculates the servo gain value by use of the first compensation table 11-1. Namely, the first compensation table 11-1 is stored with the gain values at the interval of 5° C., and therefore a gain value of the temperature "t" is calculated by implementing the linear interpolation. Hence, in accordance with the formulae (5)–(8) explained in step S5, the MPU 7 calculates the servo gain value At at the measured temperature "t" by using the gain values –β1 to 0.3 in the first compensation table 11-1.

(S16) The MPU7, if the difference exceeds the judgement value, judges that the temperature abruptly changes. In this case, the MPU 7 performs the calibration seek, and measures the servo gain value. The MPU 7 gives an indication of the calibration seek to the DSP 8. A drive signal having a fixed drive value is thereby outputted for a fixed period of time from the DSP 8, thus driving the VCM 8. The MPU 7 measures a quantity of displacement of the magnetic head 1 due to this drive from the position signal of the magnetic head 1. Then, the MPU 7 calculates the servo gain value A from the quantity of displacement.

(S17) The MPU 7 updates the servo gain value in the memory 11 to the calculated servo gain value. Further, the measured temperature of the last time in the memory 11 is updated to the measured temperature of this time. Then, the MPU 7 returns to step S12.

Thus, it is judged whether the temperature changes abruptly or not, and the compensation gain value for the temperature concerned is varied. Hence, it is feasible to obtain the precise servo gain value in which the characteristics of the VCM and of the power amplifier reflect.

Moreover, if the temperature changes abruptly, the calibration seek is carried out, and the servo gain value is thus measured. Hence, it is possible to make a change to the precise servo gain value. Moreover, the calibration seek is effected only when the temperature abruptly changes, and hence there might be a less opportunity for having the host request wait.

Besides, before the operation when switching ON the power supply, the calibration seek is carried out, and the reference value (the intrinsic value) of the device is measured, whereby the temperature characteristic corresponding to each device can be imparted.

In addition to the embodiment discussed above, the present invention can be modified as follows:

(1) The magnetic disk device has been exemplified by way of an information storage device, however, the present invention can be applied to other types of information storage devices such as a magneto-optic disk device and an optical disk device etc.

(2) The disk medium has been exemplified as a storage medium, however, the present invention can be applied to other types of storage mediums such as a card medium etc.

(3) The servo gain compensation table is stored with the temperature gradient value (the relative values) as the servo gain values with respect to the reference value, however, an absolute value may also be stored therein. In this case, the compensation table is previously created based on the servo gain intrinsic to each device which has been measured by effecting the calibration seek at each temperature with respect to the individual disk device when delivered from the factory. Accordingly, there is no necessity for designing the reference value of the servo gain before being used.

The present invention has been discussed so far by way of the embodiments but may be modified in a variety of forms within the range of the gist of the present invention, and these modifications are not excluded from the scope of the present invention.

As described above, the present invention exhibits the effects which follow.

(1) It is judged whether or not the temperature changes abruptly, and the servo gain value is varied corresponding to the change in the temperature. Hence, even if the temperature changes abruptly, the servo gain can be compensated to an adequate servo gain.

(2) If the temperature does not change abruptly, referring to the first compensation table, the servo gain is compensated. If the temperature changes abruptly, referring to the first compensation table, the servo gain is compensated. Therefore, the compensating time is reduced, and there might be no possibility of having the host request wait.

(3) If the temperature does not change abruptly, with the reference to the compensation table, the servo gain is compensated. If the temperature changes abruptly, the calibration seek is executed, and the servo gain is measured. Hence, the calibration seek is carried out only when the temperature changes abruptly, and consequently there is a less possibility of having the host request wait.

What is claimed is:

1. A servo gain compensating method in an information storage device, of generating a control quantity for positioning a head from positional information read from a storage medium by said head for reading the information from said storage medium, and compensating this control quantity with a servo gain value, said method comprising:

a step of periodically measuring a temperature of said information storage device;

a step of judging whether or not a difference between the measured temperature and the temperature measured last time is greater than or equal to a fixed value;

a first step of obtaining, if the difference is not greater than or equal to the fixed value, a servo gain value corresponding to the measured temperature on the basis of a first table storing a first servo gain characteristic value for each temperature; and a second step of obtaining, if the difference is greater than or equal to the fixed value, a servo gain value corresponding to the measured temperature on the basis of a second table storing a second servo gain characteristic value for each temperature.

2. A servo gain compensating method in an information storage device according to claim 1, wherein said first step comprises a step of calculating the servo gain value at the measured temperature from a temperature gradient coefficient corresponding to the measured temperature.

3. A servo gain compensating method in an information storage device according to claim 1, wherein said second step comprises a step of calculating the servo gain value at the measured temperature from a temperature gradient coefficient corresponding to the measured temperature.

4. A servo gain compensating method in an information storage device according to claim 2, further comprising:

a step of driving, when switching ON a power supply of said information storage device, an actuator for a fixed period of time by a fixed drive current;

a step of measuring a quantity of displacement due to the drive from the positional information of said head; and a step of calculating an intrinsic-to-device reference value of the servo gain from the quantity of displacement, wherein said first step comprises a step of calculating the servo gain value from the reference value and the temperature gradient coefficient.

5. A servo gain compensating method in an information storage device according to claim 3, further comprising:

a step of driving, when switching ON a power supply of said information storage device, an actuator for a fixed period of time by a fixed drive current;

a step of measuring a quantity of displacement due to the drive from the positional information of said head; and a step of calculating an intrinsic-to-device reference value of the servo gain from the quantity of displacement, wherein said second step comprises a step of calculating the servo gain value from the reference value and the temperature gradient coefficient.

6. The servo gain compensating method of claim 1, wherein said storage medium comprises a storage disk.

7. The servo gain compensating method of claim 1, wherein said storage disk comprises a storage hard disk.

8. A servo gain compensating method in an information storage device, of generating a control quantity for positioning a head from positional information read from a storage medium by the head for reading the information from said storage medium, and compensating this control quantity with a servo gain value, said method comprising:

a step of periodically measuring a temperature of said information storage device;

a step of judging whether or not a difference between the measured temperature and the temperature measured last time is greater than or equal to a fixed value;

a first step of obtaining, if the difference is not greater than or equal to the fixed value, a servo gain value corresponding to the measured temperature on the basis of a servo gain characteristic; and a second step of measuring, if the difference is greater than or equal to the fixed value and after driving an actuator by a fixed drive current for a fixed period of time, a quantity of displacement due to the drive from the positional information of said head, and calculating a servo gain value from the quantity of displacement.

9. A servo gain compensating method in an information storage device according to claim 8, wherein said first step comprises a step of calculating the servo gain value at the measured temperature from a temperature gradient coefficient with respect to a predetermined temperature.

10. A servo gain compensating method in an information storage device according to claim 9, further comprising:

a step of driving, when switching ON the power supply of said information storage device, the actuator for a fixed period of time by a fixed drive current;

a step of measuring a quantity of displacement due to the drive from the positional information of said head; and a step of calculating an intrinsic-to-device reference value of the servo gain from the quantity of displacement, wherein said first step comprises a step of calculating the servo gain value from the reference value and the temperature gradient coefficient.

11. The servo gain compensating method of claim 8, wherein said storage medium comprises a storage disk.

12. The servo gain compensating method of claim 11, wherein said storage disk comprises a storage hard disk.

13. An information storage device for generating a control quantity for positioning a head from positional information read from a storage medium by said head for reading the information from said storage medium, and compensating this control quantity with a servo gain value, said device comprising:

- temperature detecting means for measuring a temperature of said information storage device;
- a first table stored with a first servo gain characteristic value for each temperature;
- a second table stored with a second servo gain characteristic value for each temperature; and
- a control circuit for, when recognizing a change in temperature measured by said temperature detecting means at an interval of a predetermined time, referring to said first table if a quantity of change is not greater than or equal to a fixed value, then referring to said second table if the quantity of change is greater than or equal to the quantity of change, and obtaining a servo gain value corresponding the measured temperature.

14. The information storage device of claim 13, wherein said storage medium comprises a storage disk.

15. The information storage device of claim 14, wherein said storage disk comprises a storage hard disk.

16. An information storage device for generating a control quantity for positioning a head from positional information read from a storage medium by said head for reading the information from said storage medium, and compensating this control quantity with a servo gain value, said device comprising:

- temperature detecting means for measuring a temperature of said information storage device;
- a table stored with a servo gain characteristic; and
- a control circuit for, when recognizing a change in temperature measured by said temperature detecting means at an interval of a predetermined time, obtaining a servo gain value corresponding to the measured temperature by referring to said table if a quantity of a change is not greater than or equal to a fixed value, and, if the quantity of a change is greater than or equal to a fixed value, measuring a quantity of displacement due to a drive by driving an actuator for moving said head by a fixed drive current for a fixed period and obtaining the servo gain value from the quantity of the displacement.

17. The information storage device of claim 16, wherein said storage medium comprises a storage disk.

18. The information storage device of claim 17, wherein said storage disk comprises a storage hard disk.

* * * * *

UNITED STATES PATENT AND TRADEMARK OFFICE
CERTIFICATE OF CORRECTION

PATENT NO. : 6,301,207 B1
DATED : October 9, 2001
INVENTOR(S) : Isokawa et al.

It is certified that error appears in the above-identified patent and that said Letters Patent is hereby corrected as shown below:

<u>Column 10,</u>
Line 23, delete "1" and insert -- 6 -- therefor.

Signed and Sealed this

Tenth Day of September, 2002

Attest:

Attesting Officer

JAMES E. ROGAN
*Director of the United States Patent and Trademark Office*